United States Patent
Laskowski

(10) Patent No.: US 12,246,997 B1
(45) Date of Patent: Mar. 11, 2025

(54) METHOD FOR MANUFACTURING ORGANIC FERTILIZER

(71) Applicant: Organilock, Inc., Madisonville, KY (US)

(72) Inventor: Scott Laskowski, Madisonville, KY (US)

(73) Assignee: ORGANILOCK, INC., Madisonville, KY (US)

( * ) Notice: Subject to any disclaimer, the term of this patent is extended or adjusted under 35 U.S.C. 154(b) by 0 days.

(21) Appl. No.: 16/437,935

(22) Filed: Jun. 11, 2019

Related U.S. Application Data

(60) Provisional application No. 62/683,121, filed on Jun. 11, 2018.

(51) Int. Cl.
*C05F 1/00* (2006.01)

(52) U.S. Cl.
CPC .................. *C05F 1/005* (2013.01)

(58) Field of Classification Search
CPC .......... C05F 1/002; C05F 1/005; C05F 1/007; C05F 1/02; C05F 3/00; C05F 17/60; C05F 17/80; A23K 10/22; A23K 10/26; A23K 10/30
See application file for complete search history.

(56) References Cited

U.S. PATENT DOCUMENTS

| | | | | |
|---|---|---|---|---|
| 6,312,492 | B1* | 11/2001 | Wilson | C05F 3/00 71/36 |
| 2003/0072866 | A1* | 4/2003 | Higgs | A23K 10/14 426/618 |
| 2009/0120147 | A1* | 5/2009 | Blais | C05F 11/08 435/252.4 |
| 2010/0202936 | A1* | 8/2010 | Holtzapple | A23J 3/04 422/187 |

OTHER PUBLICATIONS

Radovich, T., and N. Arancon. "Teatime in the tropics: Compost quality" University of Hawaii, United States of America (2011) pp. 9-18. (Year: 2011).*
EPA. "Animal Feeding Operations—Use of Manure" <https://www.epa.gov/npdes/animal-feeding-operations-uses-manure> Aug. 3, 2020 (Year: 2020).*

* cited by examiner

*Primary Examiner* — Jennifer A Smith
(74) *Attorney, Agent, or Firm* — Eric B. Fugett; Mark A. Pitchford; Pitchford Fugett, PLLC

(57) ABSTRACT

Methods for manufacturing organic fertilizer and soil products from animal tissue and other biomass are disclosed, along with the fertilizer and soil products produced therefrom.

6 Claims, 5 Drawing Sheets

METHOD FOR MANUFACTURING ORGANIC FERTILIZER

CROSS-REFERENCES TO RELATED APPLICATIONS

This application claims priority to U.S. Provisional Patent Application Ser. No. 62/683,121, filed on Jun. 11, 2018 and entitled "ORGANIC FERTILIZER AND SOIL AND METHODS OF MAKING SAME," the entirety of which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND OF THE INVENTION

The present disclosure relates generally to organic fertilizer and soil products and processes for manufacturing such products.

Fertilizer products can generally comprise organic or inorganic materials of natural or synthetic origin that can supply one or more essential nutrients to plants of all kinds. In varying proportions, fertilizer products can generally provide one or more primary macronutrients, such as, for example, nitrogen (N), phosphorus (P), and potassium (K); one or more secondary macronutrients, such as, for example, calcium (Ca), magnesium (Mg), and sulfur(S); and one or more micronutrients, such as, for example, boron (B), chlorine (Cl), copper (Cu), iron (Fe), manganese (Mn), molybdenum (Mb), zinc (Zn), nickel (Ni), silicon (Si), cobalt (Co), and vanadium (V).

Primary and secondary nutrients can be consumed by plants in large quantities, and can be present in plant tissues at levels ranging from 0.15 wt. % to 6 wt. % on a dry matter basis (i.e., 0% moisture). Micronutrients can be consumed in smaller quantities, and can be present in plant tissues at part per million levels, for example, from about 0.15 ppm to about 400 ppm on a dry matter basis. Other micronutrients required by plants, such as carbon, hydrogen, and oxygen can be supplied via water, such as rainfall or irrigation, and carbon dioxide from the atmosphere.

Adequate nitrogen in the contents of soil is essential for healthy plants. To be nutritious to plants, nitrogen must be made available in a form that is usable by plants. The term "fixation" broadly refers to the conversion of atmospheric nitrogen ($N_2$) to a plant available form. Nitrogen fixation occurs naturally through the conversion of atmospheric nitrogen ($N_2$) to ammonia ($NH_3$) or ammonium ($NH^{4+}$) by various microorganisms living in the soil and certain plants (e.g., legumes). Another way in which nitrogen is made available to plants is through the biological process of "mineralization." Mineralization is the process by which microorganisms decompose organic nitrogen from manure, crop residues, and other organic matter to ammonium ($NH^{4+}$). Despite the continual occurrence of these natural processes, the amount of plant available nitrogen present in a given amount of soil can and often does become depleted.

One way the levels of nitrogen in soil can become depleted is through the process known as "immobilization." Immobilization is the opposite of mineralization in that it involves the conversion of inorganic compounds to organic compounds by microorganisms or plants, by which nitrogen is prevented from being available to desirable plants such as crop plants. Whether nitrogen is mineralized or immobilized depends on the ratio of carbon (C) to nitrogen (N) (i.e., C:N ratio) in decomposing organic matter, such as crop residues. Nitrogen immobilization occurs when decomposing organic matter contains low amounts of nitrogen. For example, when plant residues contain inadequate amounts of nitrogen, microorganisms in the soil scavenge the soil for nitrogen (e.g., nitrate and ammonium) in competition with desirable crop plants, and in so doing, make the nitrogen unavailable to such crop plants. Thus, immobilization occurs when the source of organic matter has a high C:N ratio.

Industrially produced, nitrogen-containing fertilizers are frequently used to combat nitrogen immobilization by enhancing and supplementing the nitrogen levels in soil in which crops are grown in order to produce greener, lusher, and faster-growing plants. However, nutrients from inorganic (i.e., synthetic) fertilizers, while inexpensive and easy to apply, tend to wash out or gas out of the soil, requiring reapplication on a regular basis. Additionally, since inorganic fertilizers are concentrated and release quickly, they tend to burn plant roots more than organic materials and can kill beneficial microorganisms present in the soil.

Inorganic fertilizers also tend to have high electrical conductivity ("EC). Electrical conductivity is a measure of the amount of salts in soil (i.e., salinity of soil). For example, even slight accidental overapplication of inorganic fertilizer products having a high EC value can be expected to shock or "burn" roots and kill both crop and ornamental plants. It is believed that inorganic fertilizers cause this damage by introducing salts into and thereby reducing the water potential of the water supply surrounding a plant. This in turn makes the water less available to the plant and causes water stress in the plant.

Fertilizers that are derived from an organic source are preferable for a variety of reasons. Organic fertilizers tend to have a lower burning potential (i.e., lower EC) and a lower leach potential. They also replenish the soil with micronutrients, essential amino acids, and organic matter that were consumed by previous agricultural and horticultural activity.

However, most fertilizers derived from an organic source have a nitrogen content that is substantially less than existing inorganic or synthetic fertilizer products, and the nitrogen is usually present in a slow-release form. The slow release nitrogen in most organic fertilizers must be broken down over time by microorganisms in the soil for organic nitrogen to be converted (i.e., mineralized) into a form that is usable by plants. This aspect of organic fertilizer products entices many consumers to purchase synthetic fertilizers that provide a higher level of nitrogen and a quicker release into the soil for uptake by the plant, but carries the previously mentioned risk of inadvertent overapplication, which is problematic.

Yet another problem with currently available organic fertilizers is that they tend to carry undesirable life forms such as seeds and insects and have a moisture content or water activity level high enough to support germination and microbial growth, which not only fosters decomposition of the material and reduces shelf life, but also facilitates the spread of undesirable and even pathogenic organisms to the plants being fertilized.

A related problem facing the agriculture industry is the environmentally acceptable disposal of animal mortalities, including whole and partial carcasses, and large volumes of animal waste. For example, animal producers of all kinds commonly encounter losses due to disease, accidents, inter-animal competition, and natural disasters. Safe disposal of carcasses is an important issue for routine management of animal mortalities to prevent disease transmission and to protect air and water quality. As traditional methods of disposal such as burial, incineration and rendering have lost favor or increased in cost, farmers, butchers and public works departments are finding it increasingly difficult to find biosecure, inexpensive, and environmentally safe disposal options. Although composting animal mortalities is providing another option for animal mortality disposal, many animal producers lack the required space, equipment, time or desire to properly isolate the carcasses from the environment until they decompose. Therefore, carcass disposal remains one of the major problems facing animal producers.

What is needed then are improvements in organic fertilizer and soil products, and methods for consistent manufacturing of same. What is also needed are improvements in environmentally safe methods of disposing of animal mortalities. These and other needs are satisfied by the products and processes of the present disclosure.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

This summary describes several embodiments of the presently-disclosed subject matter, and in some cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of such features.

In accordance with the purpose(s) of the invention, as embodied and broadly described herein, this disclosure, in one aspect, relates to a method for manufacturing an organic fertilizer product. The method for manufacturing an organic fertilizer product can comprise providing an animal tissue composition; providing a composition of fresh nitrogenous and/or carbonaceous biomass containing substantially no animal tissue; reducing the moisture content of the fresh biomass composition to about 25% by weight or less (i.e., on a wet basis); combining the reduced moisture content fresh biomass composition with the animal tissue composition to form a substantially homogeneous base mixture having a moisture content of between about 25% and about 60% by weight; and subjecting the base mixture to at least one further processing step to produce a dehydrated organic fertilizer wherein about 90% by weight of the total nitrogen in the fertilizer is organic nitrogen and about 10% by weight of the total nitrogen in the fertilizer is plant-available nitrogen.

In another aspect, a method for manufacturing an organic fertilizer product can comprise providing a composition of fresh animal tissue comprising muscle, bone, blood, and organ tissue from one or more animal carcasses; providing a composition of fresh biomass containing substantially no animal tissue; drying the biomass composition to a moisture content of about 25% by weight or less; combining the dried biomass composition with the animal tissue composition in a ratio of from about 1:1 to about 3:1 by volume to form a substantially homogeneous base mixture; reducing the particle size of the base mixture; subjecting the base mixture to a thermal stabilization process; and dehydrating the base mixture to produce an organic fertilizer having a moisture content of less than about 15% and a total nitrogen content of from about 3% to about 6% by weight, wherein from about 80% to about 95% the total nitrogen is organic nitrogen, and from about 5% to about 20% of the total nitrogen is plant-available nitrogen.

In yet another aspect, a method for manufacturing an organic fertilizer product can comprise providing a first composition consisting substantially of either sewage sludge or fresh muscle, bone, blood, and organ tissue from at least one animal carcass; providing a second composition comprising one or more organic substances other than sewage sludge and animal muscle, bone, blood, or organ tissue; combining the second composition with the first composition in a ratio of from about 1.5:1 to about 2.5:1 by volume to form a substantially homogeneous base mixture having a moisture content of between about 25% and about 60% by weight; dehydrating the base mixture to a moisture content of less than about 15% by weight; pasteurizing the base mixture; and reducing the particle size of the dehydrated and pasteurized base mixture to an average particle size of less than about 0.3750 inches to produce an organic fertilizer.

In still yet another aspect, the disclosure relates to a dehydrated, pasteurized, nutrient infused organic fertilizer product derived from an organic source and having a higher level of organic matter infused with organic nitrogen than other organic fertilizers. As such, an organic fertilizer produced using one or more aspects of the disclosure can advantageously include a carbon to nitrogen ratio of from about 25:1 to about 10:1 or less, a moisture content of less than about 15% on a wet basis, a total nitrogen content of about 3% to about 6% by weight, a phosphorous content of from about 1% to about 11% by weight, and a potassium content of from about 1% to about 11% by weight; wherein from about 80% to about 95% of the total nitrogen is organic nitrogen, and from about 5% to about 20% of the total nitrogen is plant-available nitrogen. In some embodiments, about 90% of the total nitrogen is organic nitrogen, and about 10% of the total nitrogen is plant-available nitrogen. In some embodiments, the moisture content is from about 4% to about 6% by weight.

Numerous other objects, advantages and features of the present disclosure will be readily apparent to those of skill in the art upon a review of the following drawings and detailed description of a preferred embodiment.

BRIEF DESCRIPTION OF THE DRAWINGS

Non-limiting and non-exhaustive embodiments are described with reference to the following figures, which illustrate several aspects of and together with the description serve to explain the principles of the invention. In the drawings, like reference numerals refer to like parts throughout the various drawings unless otherwise specified. Not all reference numbers are included in each drawing, for the sake of clarity.

Figure 1:
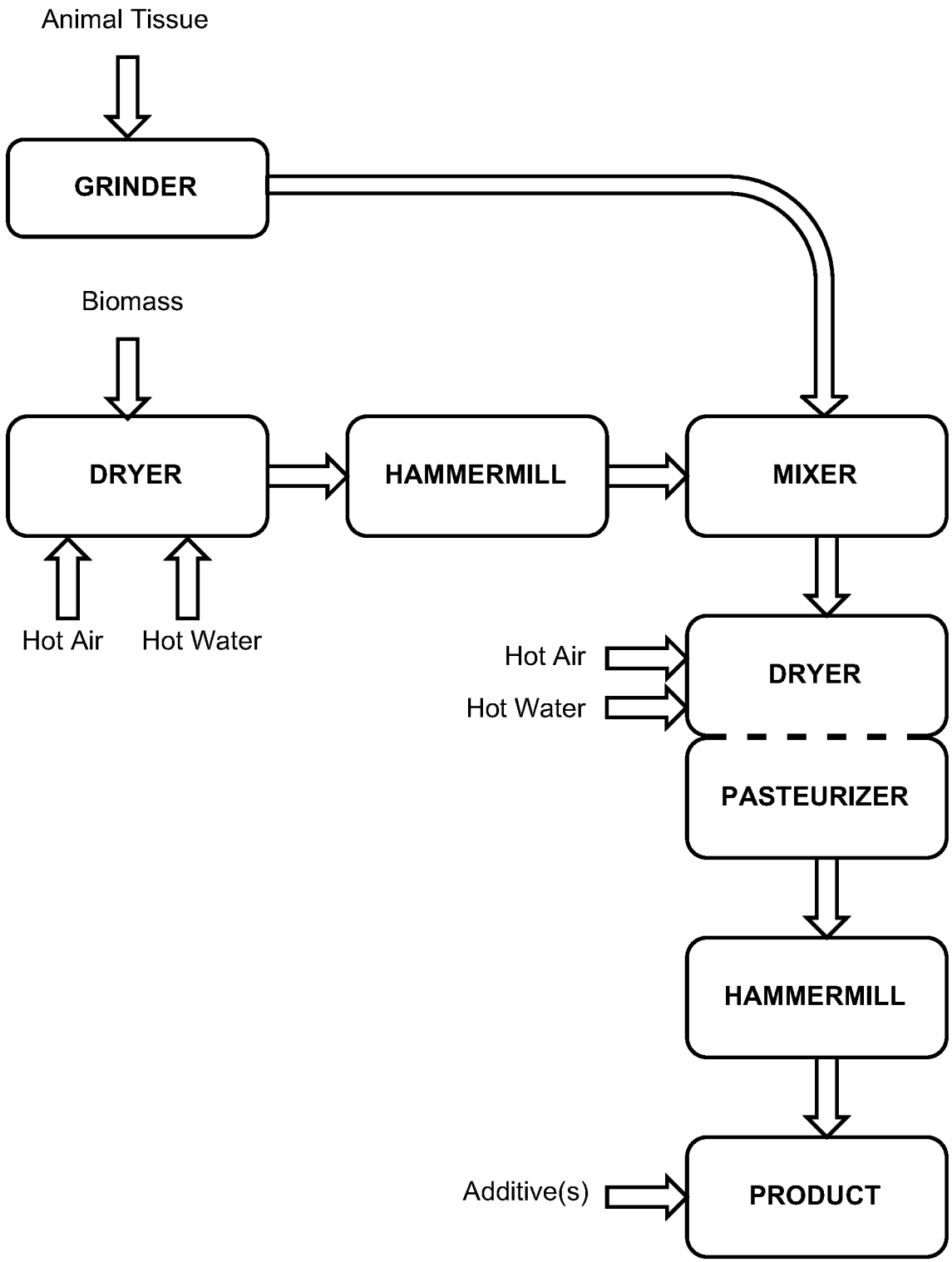
FIG. 1 is a schematic drawing of an embodiment of a process for manufacturing an organic fertilizer product in accordance with various aspects of the present invention.

Additional aspects of the invention will be set forth in part in the description and figures which follow, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention.

Unless defined otherwise, all technical and scientific terms used herein have the same meaning as commonly understood by one of ordinary skill in the art to which the subject matter disclosed herein belongs. While the terms used herein are believed to be well understood by one of ordinary skill in the art, certain definitions are set forth herein to facilitate explanation of the subject matter disclosed herein. The terms defined herein have meanings as commonly understood by a person of ordinary skill in the portions relevant to the present invention. Terms such as "a," "an," and "the" are not intended to refer to only a singular entity, but rather include the general class of which a specific example may be used for illustration. Accordingly, the terms "a", "an", and "the" refer to "one or more" when used in this application, including the claims. For example, reference to "a nutrient" includes a plurality of such nutrients, and so forth. The use of the word "a" or "an" when used in conjunction with the term "comprising" in the claims and/or the specification may mean "one," but it is also consistent with the meaning of "one or more," "at least one," and "one or more than one." The terminology herein is used to describe specific embodiments of the invention, but their usage does not delimit the invention, except as set forth in the claims.

All references to singular characteristics or limitations of the present disclosure shall include the corresponding plural characteristic(s) or limitation(s) and vice versa, unless otherwise specified or clearly implied to the contrary by the context in which the reference is made.

All combinations of method or process steps as used herein can be performed in any order, including simultaneously, unless otherwise specified or clearly implied to the contrary by the context in which the referenced combination is made.

The methods and devices of the present disclosure, including components thereof, can comprise, consist of, or consist essentially of the essential elements and limitations of the embodiments described herein, as well as any additional or optional components or limitations described herein or otherwise useful.

Unless otherwise indicated, all numbers expressing physical dimensions, quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently disclosed subject matter.

As used herein, the term "about," when referring to a value or to an amount of mass, weight, time, volume, concentration, percentage or a physical dimension such as length, width, or diameter, is meant to encompass variations of in some embodiments ±20%, in some embodiments ±10%, in some embodiments ±5%, in some embodiments ±1%, in some embodiments ±0.5%, and in some embodiments ±0.1% from the specified value or amount, as such variations are appropriate to perform the disclosed methods.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The present application can "comprise" or "consist essentially of" the components of the present invention as well as other ingredients or elements described herein. As used herein, "comprising" is open ended and means the elements recited, or their equivalent in structure or function, plus any other element or elements which are not recited. The terms "having" and "including" are also to be construed as open ended unless the context suggests otherwise.

All patents, patent applications, published applications and publications, databases, websites and other published materials referred to throughout the entire disclosure herein, unless noted otherwise, are incorporated by reference in their entirety.

The term "when" is used to specify orientation for relative positions of components, not as a temporal limitation of the claims or composition described and claimed herein unless otherwise specified.

As used herein, the terms "optional" or "optionally" means that the subsequently described event or circumstance can or cannot occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

Each of the starting materials disclosed herein are either commercially available and/or the methods for the production thereof are known to those of skill in the art. Each of the tanks, vessels, transfer lines, augers, mixers, dryers, pumps, valves, grinders, liquidators, and other machinery and equipment recited herein are commercially available or can be fabricated by those of ordinary skill in the art. Moreover, such tanks, vessels, and the like, can be made of any material, such as, for example, stainless steel, suitable for use in handling the waste, chemicals, and environmental conditions described herein. Although any methods and materials similar or equivalent to those described herein can be used in the practice or testing of the present invention, example methods and materials are now described.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As used herein, the term "plant-available nitrogen" means nitrogen in a chemical form that can be readily absorbed by plant roots, including but not limited to nitrogen contained in nitrate ($NO_3$), ammonia ($NH_3$), and ammonium ($NH^{4+}$).

As used herein, the term "animal tissue" means any part, component, or portion, without limitation, of an animal carcass, such as, for example, muscle, bone, blood, and organ tissue, including offal.

As used herein, the terms "dehydrated" and "dried" are intended to refer to a substance from which water has been partially removed. In some embodiments, the terms "dehydrated" and "dried" are intended to refer to substances having a moisture content of about 15% (on a wet basis) or less. For example, a "dehydrated" or "dried" substance is one that has a wet basis moisture content of about 15%, 14%, 13%, 12%, 11%, 10%, 9%, 8%, 7%, 6%, 5%, 4%, 3%, 2%, or 1% or less.

As used herein, the term "thermal stabilization" is intended to refer to a process that eliminates or reduces the population of bacteria that cause anaerobic decomposition of organic matter.

As used herein, the term "pasteurization" is intended to refer to a heat treatment process that kills, eliminates, renders inert, or inactivates seeds, insects, plant life, and pathogens, including transmissible agents such as fungi, bacteria, viruses, spore forms, and the like, present on a surface or contained in a fluid. Pasteurization is not intended to imply the complete elimination of all forms of life.

As used herein, the term "biomass" means any organic matter. Biomass usable in an organic fertilizer or soil product disclosed herein can comprise any nitrogenous or carbonaceous plant matter, animal excreta, or combination of both plant matter and animal excreta. Non-limiting examples of suitable biomass usable in the organic fertilizer or soil products of the present disclosure include dried sawdust, grasses, woodchips, recycled wood, biochar, manure, and animal stall waste.

As used herein, the term "biochar" means a solid material obtained from carbonization of biomass. Biochar as disclosed herein can be advantageously added to the fertilizers of the present disclosure to create soil products with improved soil functions and to reduce emissions from biomass that would otherwise naturally degrade to greenhouse gases. Such biochar also provides appreciable carbon sequestration value.

The term "fresh" as used herein means a substance that has not been substantially rendered, composted, decomposed or rotted. For example, it is to be understood generally that biomass may still qualify as "fresh" even if such biomass has undergone some amount of enzymatic and/or microbial decomposition deriving from processes which would be expected to occur during the time between collection and processing of such biomass as described herein. In a further example, it is to be understood that animal tissue may likewise qualify as "fresh" even if the tissue has undergone some amount of enzymatic and/or microbial decomposition deriving from processes which begin upon death of the live animal from which the tissues are derived, for example, as would be expected to occur during the time between death of such animal and processing of the animal's tissues as described herein. It is to be further understood that "fresh" animal tissues are those which have not been substantially dried or dehydrated, or otherwise subjected to a drying process. As such, "fresh" animal tissues are those which contain a ratio of liquids to solids substantially equivalent to that present in the live animal.

As used herein, the term "animal tissue composition" means a composition of fresh animal tissue comprising muscle, bone, blood, and organ tissue from one or more animal carcasses. An "animal tissue composition" disclosed herein can include whole, intact carcasses (e.g., chicken carcasses from an egg-laying operation), partial carcasses, offal from a meat processing operation, or any combination of the foregoing. In some aspects, the term "animal tissue composition" can encompass compositions of muscle, bone, blood, and organ tissue from one or more whole or gutted fresh carcasses of the same type of animal. In other aspects, the term "animal tissue composition" can encompass compositions of muscle, bone, blood, and organ tissue from multiple fresh carcasses of different types of animals, such as, for example, fish, hogs, turkey, chickens, or other animals not specifically recited herein. In one aspect, the term "animal tissue composition" means a composition of substantially equal amounts of fresh muscle, bone, blood, and organ tissues from one or more substantially whole or gutted fish. Fresh animal tissue for use in an animal tissue composition disclosed herein can be obtained from a variety of commercially available sources.

As used herein, the term "poultry manure" is intended to refer to poultry excreta that can be used as a fertilizer.

As used herein, the term "chicken manure" is intended to refer to chicken excreta that can be used as a fertilizer.

As used herein, the term "animal waste composition" is intended to refer to a mixture of animal excreta and bedding material or litter used in animal husbandry operations to, for example, ease the handling of excreta. Conventional bedding materials include but are not limited to wood by-product (e.g., shavings, chips, sawdust, pellets), straw, hay, peanut hulls, shredded sugar cane, paper, and/or other absorbent, low-cost, organic materials. In one aspect, "animal waste composition" can refer to a composition comprising chicken manure. In other aspects, "animal waste composition" can refer to a composition comprising excreta from other animals, such as, for example, hogs, turkey, or other animals not specifically recited herein. In yet another aspect, "animal waste composition" can refer to a mixture of waste products from two or more types of animals. No specific moisture and/or solids content is intended to be implied by the term "animal waste composition". Preferred animal waste compositions comprising poultry manures can include poultry litter from broiler houses and manure from egg-laying operations. Poultry bedding from broiler houses typically has a N value of about 2 wt. % while unadulterated waste product from egg laying chickens (known as "layer manure") typically has an N value of about 4 wt. %.

As used herein, the term "organic" is intended to refer to a natural source, for example, of a starting material. While not intended to be limiting, a starting material for an organic fertilizer or soil product can comprise plant matter and/or animal tissues, rock powder, seaweed, inoculants, conditioners, dairy product waste, livestock manure, liquid manure, worm castings, peat, guano, compost, blood meal, bone meal, fish meal, crop residue, cheese whey, mixed liquor from food and/or livestock processing facilities, wastewater from food processing operations, sewage sludge, stall waste from animal husbandry, and any combination thereof. However, the list provided herein is not meant to be limiting, as any natural source that provides nitrogen, phosphate, and/or potash can be, for example, a starting material for an organic fertilizer product.

As used herein, the term "sewage sludge" is intended to refer to the residual, semi-solid material that is produced as a by-product during sewage treatment of industrial or municipal wastewater. Sewage sludge may be considered fresh if anaerobic processes have not yet become substantially active.

An animal tissue composition can be prepared by combining muscle, bone, blood, and/or organ tissue from one or more partial and/or whole carcasses of one or more fish or other animals in a container such as a large tote. In some embodiments, the animal tissue composition is prepared by combining muscle, bone, blood, and organ tissue from one or more partial and/or whole carcasses of one or more animals. In one embodiment, the muscle, bones, intestines and heads of a plurality of fresh fish are combined in substantially equal proportions to form an animal tissue composition. In some embodiments, the muscle, bone, blood, and organ tissue of a plurality of chickens are combined in substantially equal proportions to form the animal tissue composition.

The animal tissue composition can be processed by any method capable of physically reducing the size of and blending the different pieces of constituent animal tissues. Non-limiting examples of suitable methods to reduce the size of and blend pieces of animal tissue in the animal tissue composition include, but are not limited to, mincing, crushing, grinding, and liquidation by alkaline hydrolysis. For example, in one embodiment, a chum grinder can be used to grind an animal tissue composition into a uniform soft, wet, pulpy mass or mush. In another embodiment, the animal tissue composition can be crushed by placing the composition on an area of concrete and repeatedly applying pressure to the composition, for example, by driving a tractor or automobile over the composition until the desired consistency is achieved. In yet another embodiment, the animal tissue composition can also be liquidated using an alkyline hydrolysis system, and the effluent collected and used in the methods described herein. It is preferred that the specific technique used to reduce the size of animal tissues comprising the animal tissue composition allow collection and retention of any liquids discharged from the animal tissue composition during processing because liquids discharged during tissue size reduction contain valuable macro and micro nutrients important to plant growth.

In one aspect, the animal tissue composition can have a moisture content of from about 30% to about 80% by weight or higher. In various aspects, the moisture content can be adjusted, using water or a nutrient enriched liquid, to a level of at least about 70%, by weight, for example, about 70%, 71%, 72%, 73%, 74%, 75%, 76%, 77%, 78%, 79%, 80%, 81%, 82%, 83%, 84%, 85%, 86%, 87%, 88%, 89%, or higher. In other aspects, the moisture content can be adjusted to a level of at least about 90%, by weight, for example, at least about 90%, 91%, 92%, 93%, 94%, 95%, 96%, or higher; or to a level of from about 80% to about 85% by weight. It should be understood that the moisture content of an animal tissue composition can vary, depending upon type and age of animal at death, together with storage and environmental conditions in which the carcass(es) is transported.

In another aspect, a composition of fresh biomass can be provided for blending with the animal tissue composition and absorption of the nutrient rich liquids from the animal tissue composition. In one embodiment, the composition of fresh biomass can consist substantially of a mixture of carbonaceous wood products or by-products, including but not limited to shavings, chips, sawdust, and/or pellets.

In another embodiment, the composition of fresh biomass can consist substantially of animal excreta, such as horse manure. In another embodiment, the composition of fresh biomass can consist substantially of an animal waste composition.

In order to facilitate the absorption by the fresh biomass composition of as much nutrient from the animal tissue composition as possible after the two compositions are blended, the moisture content of the fresh biomass composition can first be reduced. Reducing the moisture content of the fresh biomass composition can include subjecting the biomass composition to a process capable of removing water from the biomass. Removing water from the biomass facilitates thermal stabilization and subsequent particle size reduction of the biomass into a particle size suitable for absorption of nutrient from the animal tissue composition and the intended application of the final fertilizer product.

In some embodiments, reducing the moisture content of the fresh biomass composition results in a fresh biomass composition having a moisture content of about 25% to about 15% by weight or less, for example, about 25%, 24%, 23%, 22%, 21%, 20%, 19%, 18%, 17%, 16%, or 15% by weight or less. In some preferred embodiments, reducing the moisture content of the fresh biomass composition results in a fresh biomass composition having a moisture content of about 15% to about 5% by weight or less, for example, about 15%, 14%, 13%, 12%, 11%, 10%, 9%, 8%, 7%, 6%, or 5% by weight or less. It should be understood that while biomass having a moisture content of greater than about 25% by weight can be used in the methods described herein, it is preferred that the fresh biomass composition have a moisture content or about 25% or less because the nutrient absorption capacity of the fresh biomass composition increases as the water content of the biomass composition decreases.

In one embodiment, a biomass processing and drying system (e.g., the ORGANILOCK® BPS-1000™ Biomass Processing System) can be used to reduce the moisture content of the fresh biomass composition before the biomass is combined and blended with the animal tissue composition. In a preferred embodiment, the biomass processing and drying system can include a hybrid drying system which combines a flash drying process with a hot water heated tumble drying process. As such, the biomass processing and drying system can include a series of hot water jacketed tubes heated to a temperature of from about 180° F. to about 205° F. In some embodiments, the biomass processing and drying system includes five hot water jacketed tubes, but in other embodiments, the biomass processing and drying system can include more than five, or four, three, or two hot water jacketed tubes. In preferred embodiments, each tube in the series of tubes contains an auger configured to turn or tumble a substance placed in the tube against the hot sidewalls of the tube as the substance is moved by the auger from one end of each tube to the other. A fan connected to the series of tubes can pull evaporated moisture out of the system through a cyclone. In this way, the series of hot water jacketed tubes facilitate evaporation of moisture from a substance placed inside the biomass processing and drying system, while simultaneously raising the temperature of the substance, which in some embodiments, can thermally stabilize or even pasteurize the substance (depending on the length of time that the substance is resident inside the series of hot water jacketed tubes). The hot water in the tubes act as a heat-sink that is always below pyrolysis or combustion temperature while providing adequate heat, when combined with hold time, to finish accomplishing thermal stabilization or pasteurization of the substance in the tube. In some embodiments, the first or uppermost tube of the series of tubes can also include an inlet configured to receive an injection of about 1,000° F. flue gas and/or dry atmospheric air, which can initially flash dry the substance.

A fresh biomass composition placed in such a processing and drying system can be initially flash dried at about 1,000° F. using an injected mixture of hot flue gases and a dry atmospheric air. This causes the surface moisture on the biomass to immediately evaporate and cool the flue gasses down to approximately 160° F. to 180° F. During and after the flash drying process, the biomass composition can be tumbled with augers through hot water jacketed tubes heated to a temperature of from about 180° F. to about 205° F. to sufficiently homogenize the biomass and facilitate thermal stabilization or pasteurization of the biomass. Additional hot water can be injected as needed into the jackets surrounding the tubes to maintain the temperature of the tube walls in the range of from about 180° F. to about 205° F. during the tumble-drying process. The biomass can then be maintained at temperatures above 160° F. for about 3 minutes or more to thermally stabilize the biomass. In some embodiments, the biomass can be maintained at temperatures above 160° F. for a period of time sufficient to pasteurize the biomass. Glycerin can also be added to the biomass at different points throughout the drying process to prevent or control dust.

In another aspect, the fresh biomass composition can then be pulverized to reduce the particle size. This helps increase the available surface area of the biomass for subsequent absorption of nutrients from the animal tissue composition. Non-limiting examples of suitable methods for pulverizing the dried biomass include crushing, grinding, and milling. In one embodiment, the dried biomass is milled in a hammermill to a particle size of from about ⅜" (i.e., 0.3750) inches to about 3/16" (i.e., 0.1875) inches or less.

In another aspect, the dried and pulverized fresh biomass composition can be combined with the animal tissue composition and blended until homogeneous to form a fertilizer base mixture. The combination and blending of the dried and pulverized fresh biomass composition with the animal tissue composition can be achieved by any method or mechanism capable of homogenizing the two compositions. In some embodiments, an industrial mixer can be used to combine and homogenize the dried and pulverized fresh biomass composition with the animal tissue composition.

In some embodiments, the dried and pulverized biomass composition is combined with the animal tissue composition is a ratio of from about 1:1 to about 3:1 by volume. For example, in some embodiments, the dried and pulverized biomass composition is combined with the animal tissue composition is a ratio of from about 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, or about 1.0 to 1.0 by volume. In one embodiment, the dried and pulverized biomass composition is combined with the animal tissue composition is a ratio of 2:1 by volume.

The fertilizer base mixture resulting from homogenization of the dried and pulverized biomass composition with the animal tissue composition can have a wet basis moisture content of from about 60% to about 5% or less. In some embodiments, the fertilizer base mixture can have a moisture content of about 60% to about 40% by weight or less, for example, about 60%, 59%, 58%, 57%, 56%, 55%, 54%, 53%, 52%, 51%, 50%, 49%, 48%, 47%, 46%, 45%, 44%, 43%, 42%, 41%, or 40% by weight or less. In other embodiments, the fertilizer base mixture can have a moisture content of about 40% to about 25% by weight or less, for example, about 40%, 39%, 38%, 37%, 36%, 35%, 34%, 33%, 32%, 31%, 30%, 29%, 28%, 27%, 26%, or 25% by weight or less. In a preferred embodiment, the fertilizer base mixture can have a moisture content of about 60%. In some embodiments, a wet basis moisture content of the fertilizer base mixture of about 60% can indicate that the appropriate blend or ratio of fresh biomass composition to animal tissue composition has been achieved.

In another aspect of the invention, the fertilizer base mixture can be simultaneously dehydrated to a moisture content of about 15% by weight or less and pasteurized. In some embodiments, the fertilizer base mixture can be dehydrated to a moisture content of about 15% by weight or less, for example, about 15%, 14%, 13%, 12%, 11%, 10%, 9%, 8%, 7%, 6%, 5%, 4%, 3%, 2%, or 1% by weight or less. Dehydration of the base mixture locks nutrients absorbed from the animal tissue composition into the dried biomass, while pasteurization kills, eliminates, renders inert, or inactivates seeds, insects, plant life, and pathogens, including transmissible agents such as fungi, bacteria, viruses, spore forms, and the like, present on or contained in the base mixture.

The simultaneous dehydration and pasteurization of the base mixture can be performed in the same manner and using the same equipment described above with respect to the initial reduction in the moisture content of the fresh biomass composition (e.g., a biomass process and drying system). Specifically, in one embodiment, the base mixture can be placed in a biomass processing and drying system including a series of hot water jacketed auger tubes heated to a temperature of from about 180° F. to about 205° F. and initially flash dried at a temperature of about 1,000° F. using a mixture of hot flue gases and dry atmospheric air injected into the first tube of the series. The base mixture is then tumbled with augers through the hot water jacketed auger tubes heated to a temperature of from about 180° F. to about 205° F. until the desired moisture content is achieved. The base mixture can be tumbled with augers through the hot water jacketed auger tubes at temperatures above 160° F. for a period of time sufficient to pasteurize the base mixture. The dehydrated and pasteurized base mixture can be optionally pulverized again and/or pH adjusted, then transferred to packaging or storage areas, and optionally can have additional nutrients, such as, organic nitrogen, phosphorus, or potassium nutrients added thereto. As long as ambient equilibrium moisture content conditions are maintained low (e.g., about 15% or less), the dehydrated and pasteurized base mixture can be stored virtually indefinitely.

In another aspect, the dehydrated and pasteurized base mixture can be inoculated with a composition comprising a plurality of dormant, nitrogen-mineralizing microorganisms (e.g., bacteria and mycelium species) and/or nitrogen mineralizing enzymes, such as, for example, deaminases, O-glycosidases, and acetyl hydrolases. The inoculated base mixture can be readily activated when desired by a user upon the application of water to the mixture. The water activates the microorganisms and/or enzymes, which will promptly mineralize the fresh organic nitrogen locked in the biomass, thereby releasing nitrogen and carbon dioxide for both immediate and long-term use by a plant.

In some aspects, an animal waste composition can be provided then simultaneously dehydrated to a moisture content of about 15% by weight or less and pasteurized, and subsequently pulverized as described above. In some embodiments, the animal waste composition can be dehydrated to a moisture content of about 15% by weight or less, for example, about 15%, 14%, 13%, 12%, 11%, 10%, 9%, 8%, 7%, 6%, 5%, 4%, 3%, 2%, or 1% by weight or less, before being pulverized to a particle size substantially matching that of the base mixture. In some embodiments, the animal waste composition consists substantially of poultry manure. In one embodiment, the animal waste composition consists substantially of chicken manure.

An amount of the dehydrated, pasteurized and pulverized animal waste composition can then optionally be combined with an amount of the fertilizer base mixture to modulate the nutrient content of the base mixture and thereby produce an organic fertilizer product having a nutrient profile tailored to a preselected agricultural application. For example, an amount of chicken manure can be combined with an equal amount of base mixture to increase the amount of nitrogen in resulting fertilizer product over that of the base mixture. Those of skill in the art will recognize that the precise ratio of animal waste composition to base mixture necessary to achieve a certain nutrient profile will vary depending on the constituent materials use to form the animal waste composition and base mixture, and the desired properties of the resulting final product.

An organic fertilizer product disclosed herein can be combined with biochar and/or other fresh carbonaceous biomass and minerals to produce an organic carbonaceous soil product that is free of peat moss, coir, compost, and synthetic chemicals and other synthetic materials, which has been dehydrated and pasteurized. In a preferred embodiment, an organic fertilizer product disclosed herein is blended to have a carbon to nitrogen ratio (i.e., C:N ratio) that will facilitate optimal bacterial nitrogen mineralization in the soil ecosystem. For example, in some embodiments, an organic fertilizer product disclosed herein can have a C:N ratio of from about 25:1 to about 10:1 or less. For example, in some embodiments, an organic fertilizer product disclosed herein can have a C:N ratio of from about 25, 24, 23, 22, 21, 20, 19, 18, 17, 16, 15, 14, 13, 12, 11, or 10 to one.

Organic fertilizer and soil products produced using the methods herein can have an organic nitrogen to plant available nitrogen ratio of from about 80:20 to about 95:5. For example, an organic fertilizer product produced using the methods herein can have an organic nitrogen to plant available nitrogen ratio of about 80:20, 81:19, 82:18, 83:17, 84:16, 85:15, 86:14, 87:13, 88:12, 89:11, 90:10, 91:9, 92:8, 93:7, 94:6 or 95:5. In one embodiment, an organic fertilizer product according to the invention can have organic nitrogen to plant available nitrogen ratio of 90:10.

Organic fertilizer and soil products produced using the methods herein can include standard greenhouse potting soil mixes having a pH of from about 6 to about 7, low pH mixes having a pH of from about 6 to about 4 or less, or mixes that are designed to 'recharge' old depleted growing substrate for continued use.

EXAMPLES

The following examples are intended to further illustrate aspects of the present invention without limiting its scope in any way.

Example 1

With reference to the figures, various exemplary aspects of the methods described herein are detailed below. In one aspect, an exemplary block schematic of the method is illustrated in FIG. 1. The exemplary method illustrated in FIG. 1 comprises a grinder into which an animal tissue composition in the form of whole fresh chicken carcasses selected from among egg laying facility mortalities were added and ground into a nitrogenous pulpy mass or mush. Care was taken to retain all nutrient rich liquids from the carcasses.

Fresh biomass in the form of equine manure was separately added into a dryer. Hot, dry air was injected to initially flash dry the fresh biomass, and the biomass was tumble dried in hot water jacketed auger tubes for a period of time adjust the moisture content of the manure to less than about 25 wt. % to render the manure into an absorption medium suited for absorbing the nutrient rich liquids from the ground chicken carcasses. The equine manure was then conveyed to a hammermill, where it was pulverized. However, it should be understood that in some embodiments, the step of drying the manure can naturally and sufficiently reduce the particle size of the manure so as to render subsequent pulverization unnecessary and thus optional. Glycerin was periodically added to control dust generated by drying the manure.

The manure and ground chicken carcasses were then separately transferred to an industrial mixer, where the manure and ground chicken carcasses were combined in a ratio of about 2:1 by volume and blended until homogeneous to produce a base mixture having a moisture content of about 60 wt. %. No additional water was added, as the increase in wet basis moisture content of the resulting mixture over that of the dried manure derived from the dried manure absorbing the nutrient rich liquids from the ground chicken carcasses. Notably, in some embodiments, the moisture content of the mixture can serve as an indicator that an appropriate blend of ground animal tissue and biomass has been achieved.

The mixture was then conveyed to a combination dryer and pasteurizer wherein the mixture was initially flash dried via the injection of hot, dry air, then tumble dried and heated in hot water jacketed auger tubes for a period of time sufficient to simultaneously dehydrate the mixture to a moisture level of about 5.6 wt. % and kill or inactivate any pathogens, insects, seeds and other plant life, and the like, present therein. It is to be understood, however, that in some embodiments, the dehydration and pasteurization of the mixture can instead be performed sequentially, including by using two or more separate machines or other apparatuses. That this dehydration and pasteurization can be performed simultaneously or sequentially by one or more machines is indicated by the broken lines in FIG. 1.

The dehydrated and pasteurized mixture was then conveyed to a hammermill, where it was pulverized to an average particle size of less than about 0.3750 inches to produce an organic fertilizer product, which was subsequently for nutrient composition. The pulverized mixture can be transferred to packaging or storage areas, and optionally can have additional nutrients, such as, organic nitrogen, phosphorus, or potassium nutrients added thereto. The final product can be stored for extended periods of time and used when needed as a standalone organic fertilizer product or as an ingredient in a wide range of soil amendment applications.

An organic fertilizer product formed in accordance with Example 1 exhibited the composition illustrated in Table 1, below.

TABLE 1

COMPOSITION OF ORGANIC FERTILIZER PRODUCT
Moisture Content = 5.59%
C:N Ratio = 10.28:1

| Nutrients | | Analysis |
|---|---|---|
| Total Nitrogen | % | 4.44 |
| Ammonia Nitrogen | % | 0.28 |
| Nitrate Nitrogen | % | 0.07 |
| Organic Nitrogen | % | 4.09 |
| $P_2O_5$ Total | % | 1.72 |
| $K_2$ Total | % | 1.06 |
| Magnesium | % | 0.16 |
| Calcium | % | 1.57 |
| Sulfur | % | 0.34 |
| Boron | % | 0.0005 |
| Zinc | % | 0.006 |
| Manganese | % | 0.009 |
| Iron | % | 0.13 |
| Copper | % | 0.0007 |
| Aluminum | % | 0.034 |
| Sodium | % | 0.18 |
| Cadmium | ppm | 0.035 |
| Chromium | ppm | 2.71 |
| Cobalt | ppm | 0.39 |
| Lead | ppm | 1.87 |
| Nickel | ppm | 1.72 |

Example 2

Figure 2:
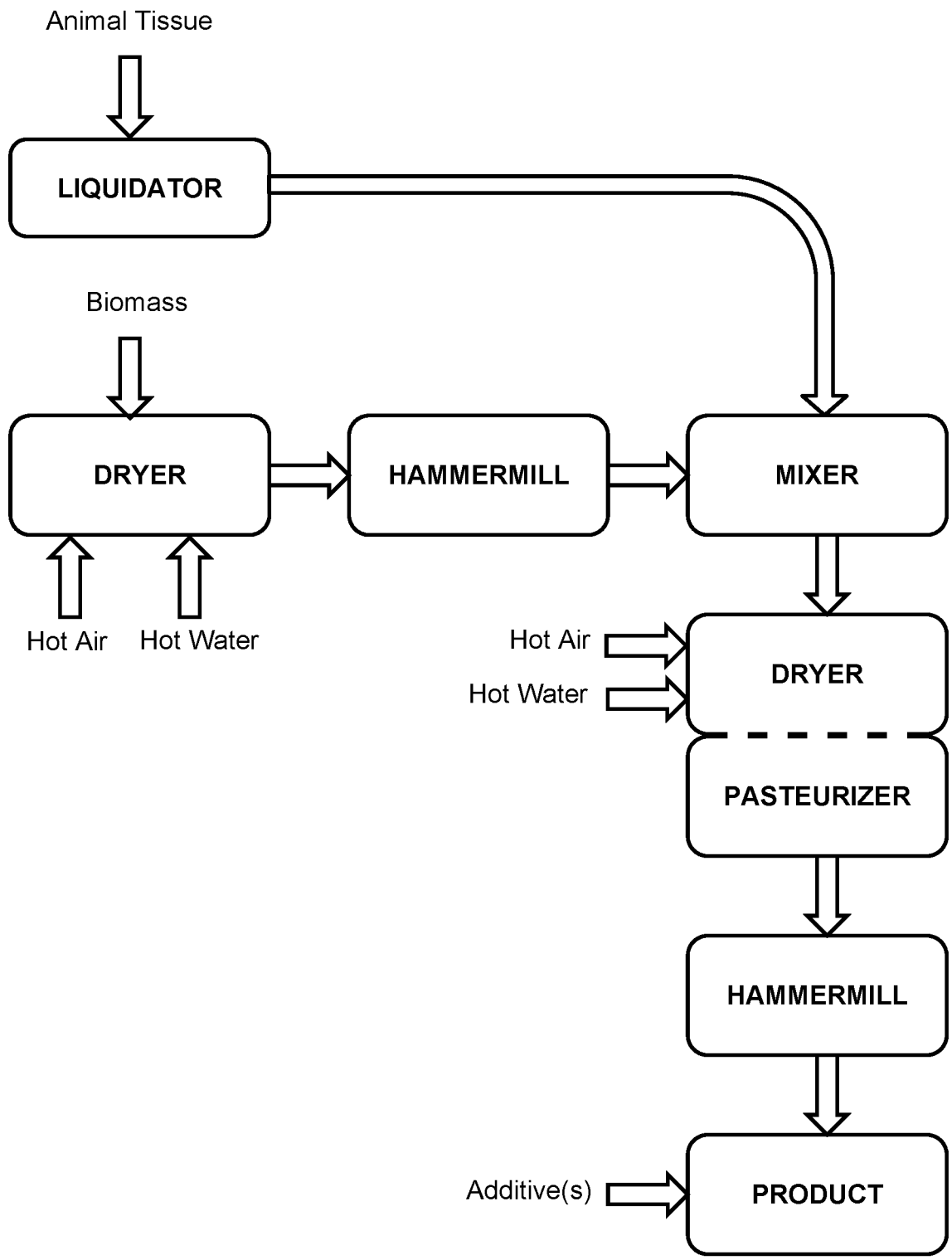
FIG. 2 is a schematic drawing of another embodiment of a process for manufacturing an organic fertilizer product in accordance with various aspects of the present invention.

In another aspect, an alternative exemplary block schematic of the method is illustrated in FIG. 2. The exemplary method illustrated in FIG. 2 comprises an alkaline hydrolysis liquidator into which an animal tissue composition in the form of whole fresh chicken carcasses selected from among egg laying facility mortalities were added and rendered to produce a nutrient rich, nitrogenous effluent.

Fresh biomass in the form of equine manure was separately added into a dryer. Hot, dry air was injected to initially flash dry the fresh biomass, and the biomass was tumble dried in hot water jacketed auger tubes for a period of time adjust the moisture content of the manure to less than about 25 wt. % to render the manure into an absorption medium suited for absorbing the nutrient rich liquids from the nitrogenous effluent. The equine manure was then conveyed to a hammermill, where it was pulverized.

The manure and effluent from the liquidated chicken carcasses were then transferred to an industrial mixer, where the manure and effluent were combined in a ratio of about 2:1 by volume and blended until homogeneous to produce a base mixture having a moisture content of about 60 wt. %.

The base mixture was then conveyed to a combination dryer and pasteurizer wherein the mixture was initially flash dried via the injection of hot, dry air, then tumble dried and heated in hot water jacketed auger tubes for a period of time sufficient to simultaneously dehydrate the mixture to a moisture level of about 4.6 wt. % and kill or inactivate any pathogens, insects, seeds and other plant life, and the like, present therein. However, as indicated by the broken lines in FIG. 2, the dehydration and pasteurization can be performed simultaneously or sequentially by one or more machines.

The dehydrated and pasteurized mixture was then conveyed to a hammermill, where it was pulverized to an average particle size of less than about 0.3750 inches to produce an organic fertilizer product, which was subsequently analyzed for nutrient composition. The pulverized mixture can be transferred to packaging or storage areas, and optionally can have one or more additional nutrients, such as, organic nitrogen, phosphorus, or potassium nutrients added thereto. The final product can be stored for extended periods of time and used when needed as a standalone fertilizer product or as an ingredient in a wide range of soil amendment applications.

An organic fertilizer product formed in accordance with Example 2 exhibited the composition illustrated in Table 2, below.

TABLE 2

COMPOSITION OF ORGANIC
FERTILIZER PRODUCT
Moisture Content = 4.64%
C:N Ratio = 10.16:1

| Nutrients | | Analysis |
| --- | --- | --- |
| Total Nitrogen | % | 4.26 |
| Ammonia Nitrogen | % | 0.03 |
| Nitrate Nitrogen | % | 0.11 |
| Organic Nitrogen | % | 4.12 |
| $P_2O_5$ Total | % | 0.9 |
| $K_2$ Total | % | 7.91 |
| Magnesium | % | 0.1 |
| Calcium | % | 0.52 |
| Sulfur | % | 0.35 |
| Boron | % | 0.0003 |
| Zinc | % | 0.004 |
| Manganese | % | 0.012 |
| Iron | % | 0.052 |
| Copper | % | 0.0005 |
| Aluminum | % | 1.45 |
| Sodium | % | 0.18 |
| Cadmium | ppm | 0.022 |
| Chromium | ppm | 2.16 |
| Cobalt | ppm | 0.023 |
| Lead | ppm | below detection limit |
| Nickel | ppm | 1.54 |

Example 3

Figure 3:
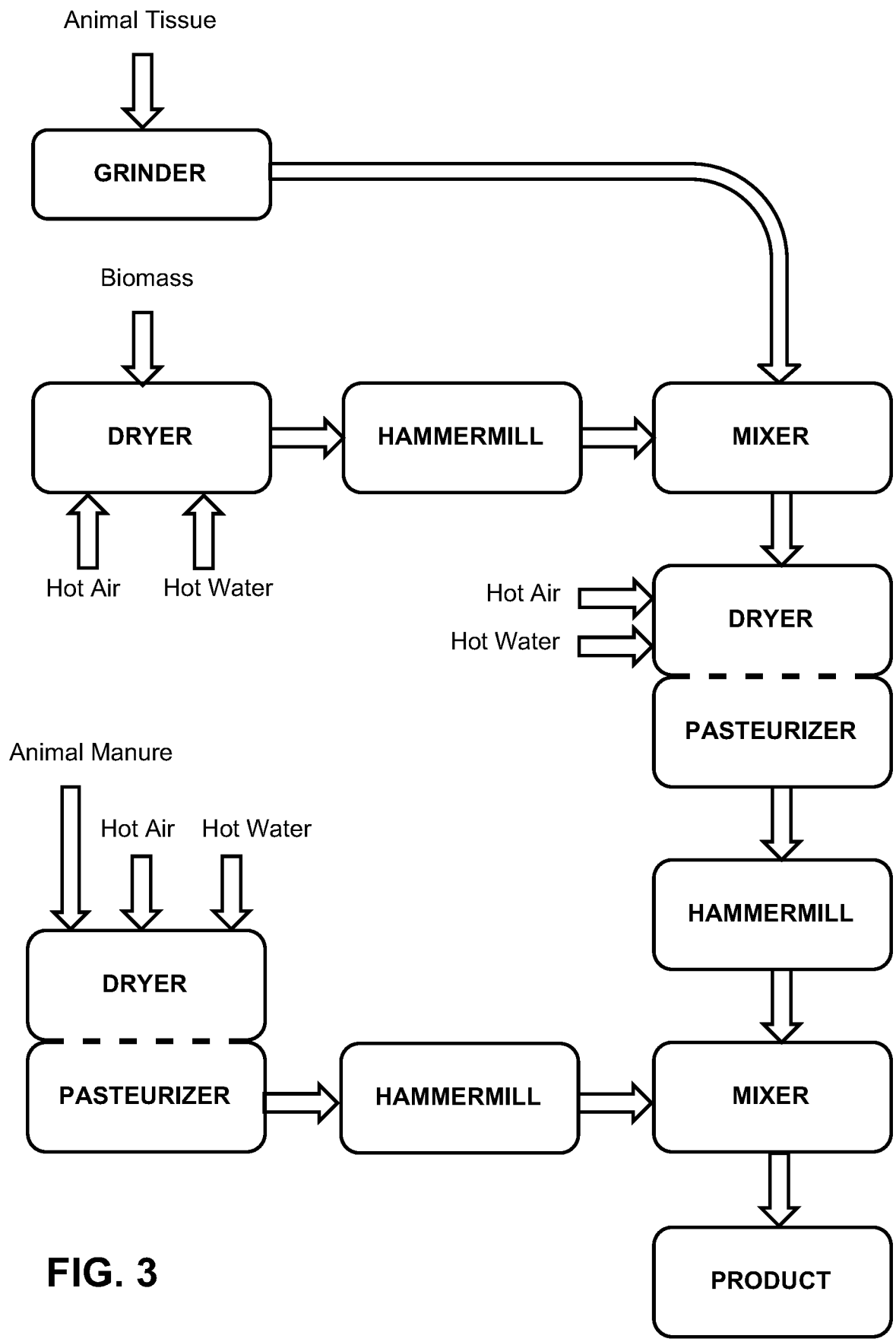
FIG. 3 is a schematic drawing of an exemplary process for manufacturing an organic fertilizer product in accordance with various aspects of the present invention.

In another aspect, another alternative exemplary block schematic of the method is illustrated in FIG. 3. The exemplary method illustrated in FIG. 3 is alike in all respects to the exemplary method illustrated in FIG. 1 except as specifically described below.

A pulverized, dehydrated, and pasteurized mixture of an animal tissue composition in the form of whole fresh chicken carcasses and fresh biomass in the form of equine manure is prepared in accordance with Example 1. The mixture has a moisture content of less than about 15 wt. %.

Chicken manure is separately added to a combination dryer and pasteurizer wherein the chicken manure is initially flash dried via the injection of hot, dry air, then tumble dried and heated in hot water jacketed auger tubes for a period of time sufficient to simultaneously dehydrate the chicken manure to a moisture level of less than about 15 wt. % and kill or inactivate any pathogens, insects, seeds and other plant life, and the like, present therein. That the dehydration and pasteurization of the chicken manure and the mixture of animal tissue and biomass can be performed simultaneously or sequentially by one or more machines is indicated by the broken lines in FIG. 3. The dehydrated and pasteurized chicken manure is then conveyed to a hammermill, where it is pulverized, preferably, to a particle size of about 0.3750 inches or less.

The pulverized chicken manure and the pulverized mixture of animal tissue and biomass are then transferred to a mixer, where the chicken manure and mixture of animal tissue and biomass are combined in a predetermined ratio and blended until homogeneous to produce a fertilizer product, which can be stored for extended periods of time and used when needed as a standalone fertilizer product or as an ingredient in a wide range of soil amendment applications.

Example 4

Figure 4:
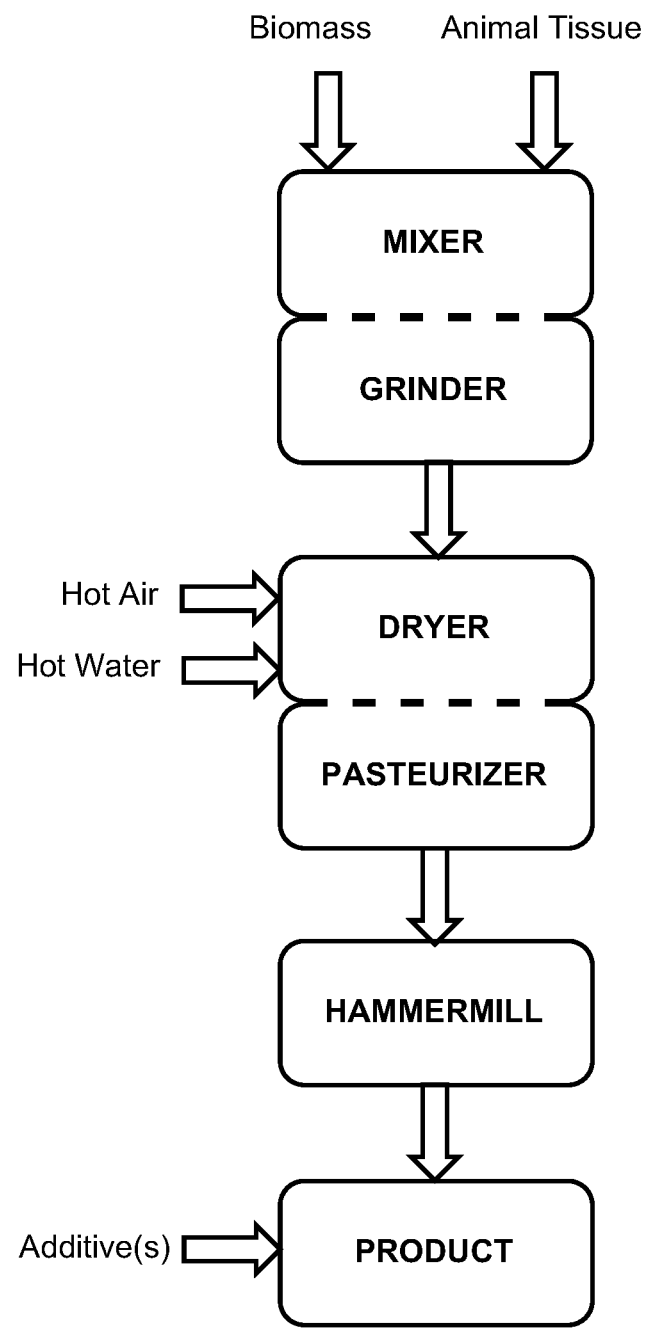
FIG. 4 is a schematic drawing of another exemplary process for manufacturing an organic fertilizer product in accordance with various aspects of the present invention.

In still yet another aspect, another alternative exemplary block schematic of the method is illustrated in FIG. 4. The exemplary method illustrated in FIG. 4 comprises a combination mixer and grinder into which a composition of fresh animal tissue comprising muscle, bone, blood, and organ tissue from one or more animal carcasses is added. Also added into the combination mixer and grinder is a biomass composition containing no animal tissue and having a moisture content of less than about 25 wt. %. The biomass composition is added to the composition of fresh animal tissue in a ratio of from about 1.5:1 to about 2.5:1 by volume, and the two are simultaneously ground and blended until homogeneous to produce a base mixture having a moisture content of between about 25 wt. % and about 60 wt. %. Care is taken to retain all nutrient rich liquids from the animal tissues. It is to be understood, as indicated by the broken lines in FIG. 4, that the mixing and grinding can be performed simultaneously or sequentially, including by one or more machines or other methods.

The base mixture is then conveyed to a combination dryer and pasteurizer, wherein the mixture is initially flash dried via the injection of hot, dry air, then tumble dried and heated in hot water jacketed auger tubes for a period of time sufficient to simultaneously dehydrate the mixture to a moisture level of about 15 wt. % and kill or inactivate any pathogens, insects, seeds and other plant life, and the like, present therein. As with the mixing and grinding, it is to be understood that the dehydration and pasteurization can be performed simultaneously or sequentially, including by one or more machines or other methods, as indicated by the broken lines in FIG. 4.

The dehydrated and pasteurized base mixture is then conveyed to a hammermill, where it is pulverized to an average particle size of less than about 0.3750 inches to produce a fertilizer product. The pulverized mixture can then be transferred to packaging or storage areas, and optionally can have additional nutrients, such as, organic nitrogen, phosphorus, or potassium nutrients added thereto. The final product can be stored for extended periods of time and used when needed as a standalone fertilizer product or as an ingredient in a wide range of soil amendment applications.

Example 5

Figure 5:
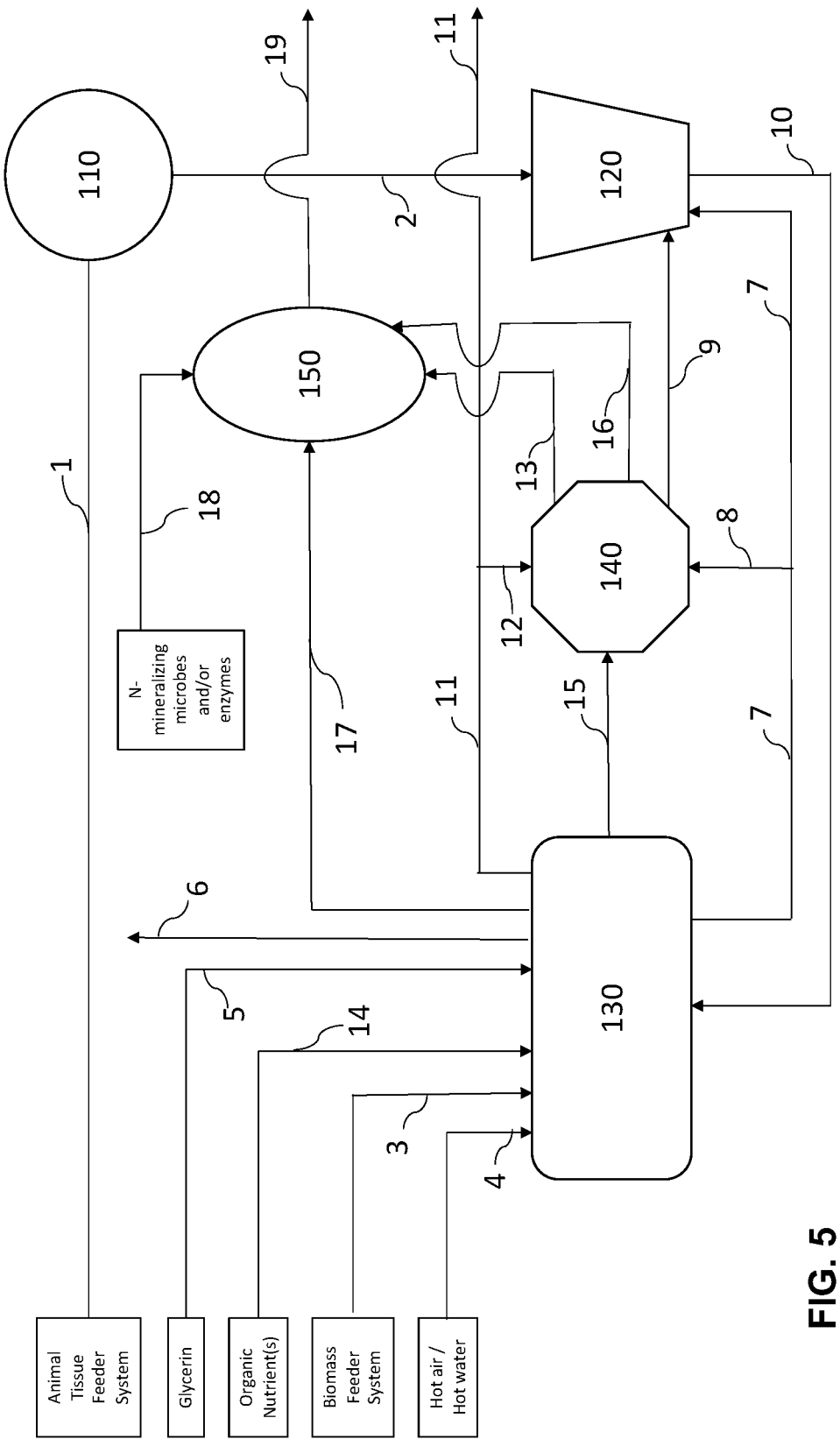
FIG. 5 is a schematic of an exemplary integrated facility for converting fresh animal tissue and other biomass into organic fertilizer products.

FIG. 5 illustrates a detailed exemplary method of manufacturing an organic fertilizer product. In such an exemplary aspect, a composition of fresh animal tissue comprising muscle, bone, blood, and organ tissue from one or more whole or partial animal carcasses selected from among egg laying facility mortalities is transferred 1 to a grinder 110, wherein the carcasses are ground to a soft, wet, pulpy mass or mush. The nutrient rich liquid and solid components of the ground animal tissue composition are then conveyed 2 to an industrial mixer 120 for further use as described below.

Separately, a composition of fresh biomass in the form of equine manure is delivered in bulk, generally by tractor-trailer, dump truck, conveyor, or the like, and transferred 3 to a biomass processing system 130 comprising a series of hot water jacketed tubes heated 4 with hot water to a temperature of about 200° F. A mixture of hot flue gas and dry atmospheric air 4 is injected into the first tube of the biomass processing system at about 1000° F. and the manure is initially flash dried, in some embodiments to a moisture content of less than about 25 wt. %. During and after flash drying, the manure is tumbled with augers through the hot water jacketed tubes for at least three minutes to homogenize and thermally stabilize the manure. Additional heat in the form of hot water is injected 4 as needed into the jackets surrounding the tubes to maintain the temperature of the tube walls in the range of from about 180° F. to about 205° F. during tumble drying. Glycerin can also be added 5 to the biomass as needed or desirable at different points throughout the drying process to control dust generated by drying the manure. Water vapor is vented 6 from the biomass processing system 130 during drying.

The dried manure is then conveyed 7 to the industrial mixer 120 for combination with the nutrient rich ground chicken carcasses. Optionally, the dried manure can first be conveyed 8 to a hammermill 140 wherein the dried biomass can be milled or pulverized to reduce the particle size of the biomass to an average particle size of about 0.3750 to about 0.1875 inches before the reduced particle size biomass is conveyed 9 to the mixer 120 for combination with the nutrient rich ground chicken carcasses.

The dried (and, optionally, pulverized) manure and the ground chicken carcasses are combined in the industrial mixer 120 in a ratio of about 2:1 by volume and blended until homogeneous to produce a base mixture having a moisture content of between about 25 wt. % and about 60 wt. %. The resulting mixture is then conveyed 10 back to the biomass processing system 130, wherein a mixture of hot flue gas and dry atmospheric air 4 is again injected at about 1000° F. and the base mixture is flash dried and tumbled with augers through the hot water jacketed tubes at temperatures of from about 180° F. to about 205° F. for a period of time sufficient to homogenize, pasteurize, and dry the base mixture to a final moisture content of less than about 15 wt. %, but preferably to a moisture content of from about 4 wt. % to about 6 wt. %.

The dehydrated and pasteurized base mixture can then be transferred 11 to a packaging or storage area and sold as a fertilizer base product, or, optionally, the dehydrated and pasteurized base mixture can be transferred 12 to the hammermill 140 for further particle size reduction and subsequently conveyed 13 to a dry mixer 150 for combination with one or more additional separately prepared organic nutrients as described below.

One or more additional organic nutrients can be provided in the form of a composition of nitrogenous animal waste that is supplied in bulk and transferred 14 to the biomass processing system 130, wherein the animal waste composition is flash dried via the injection 4 of hot flue gas and dry atmospheric at about 1000° F. and tumbled with augers through the hot water jacketed tubes at a temperature of at least 160° F., but preferably of from about 180° F. to about 205° F., for a period of time sufficient to homogenize, pasteurize, and reduce the moisture content of the animal waste composition to less than about 15 wt. %, but preferably to a moisture content of between about 4.0 wt. % and about 6.0 wt. %.

The dehydrated, pasteurized animal waste composition can then be conveyed 15 to the hammermill 140, wherein the dehydrated, pasteurized animal waste composition is milled or pulverized to reduce the particle size of the animal waste composition to an average particle size of less than about 0.3750 inches before it is conveyed 16 to the dry mixer 150 for combination with the previously dehydrated and pasteurized base mixture of manure and the ground chicken carcasses.

In the dry mixer 150, the dehydrated and pasteurized animal waste composition is combined with the dehydrated and pasteurized base mixture and blended until homogeneous to create a blended fertilizer product. A composition comprising a plurality of dormant, nitrogen-mineralizing microorganisms and/or nitrogen mineralizing enzymes can be added 18 to the blended fertilizer product before the resulting final product is transferred 19 to a packaging or storage area for packaging or pelletization and subsequent sale.

CONCLUSIONS

Aspects of the invention disclosed herein provide methods by which fresh, non-composted biomass can be lastingly infused with nutrients derived from animal mortalities to provide new organic fertilizer and soil products that contain more nutrients, including NPK, micronutrients, organic nitrogen and organic carbon, than currently available organic fertilizers and soil products. Organic fertilizers produced using the methods disclosed provide both plant available nitrogen and organic nitrogen that will slowly and naturally mineralize over time, while simultaneously adding carbon back into the soil without the side effect of nitrogen immobilization.

The carbonaceous soil products of the present disclosure advantageously achieve carbon sequestration through use of fresh carbon-based ingredients which feeds plants carbon dioxide directly into the root structure rather than by being released into the atmosphere during the composting process. Carbon sequestration is achieved by creating biochar while providing the heat required in the methods set forth herein.

Organic fertilizer products produced using the methods disclosed herein have a low C:N ratio, which allows beneficial microorganisms to slowly mineralize the relatively large quantities of organic nitrogen infused into the fertilizer substrate. Due to the relatively slow release of the organic nitrogen into a plant available form through mineralization, much larger quantities of nitrogen can be added to the fertilizer and soil products without causing harm to plants as would occur if the same levels of synthetic or inorganic nitrogen were added.

Aspects of the methods disclosed herein provide effective, environmentally safe, and biosecure methods for responsibly disposing of animal mortalities and treating animal waste and contaminated bedding materials. For example, in one aspect, the methods can at least partially detoxify animal excreta or a composition comprising animal excreta and generate organic fertilizers therefrom.

Although embodiments of the present invention have been described in detail, it will be understood by those skilled in the art that various modifications can be made therein without departing from the spirit and scope of the invention as set forth in the appended claims. For example, in some aspects, sewage sludge can be substituted for an animal tissue composition in the methods described herein to produce an organic fertilizer product of the invention.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful METHOD FOR MANUFACTURING ORGANIC FERTILIZER, it is not intended that such references be construed as limitations upon the scope of this invention except as set forth in the following claims.

What is claimed is:

1. A method for manufacturing an organic fertilizer product, the method comprising:
   providing a composition of fresh animal tissue comprising muscle, bone, blood, and organ tissue from one or more animal carcasses;
   providing a composition of fresh biomass containing substantially no animal tissue;
   drying the biomass composition to a moisture content of about 25% by weight or less;
   combining the dried biomass composition with the animal tissue composition in a ratio of from about 1:1 to about 3:1 by volume to form a substantially homogeneous base mixture;
   reducing the particle size of the base mixture;
   subjecting the base mixture to a thermal stabilization process; and
   dehydrating the base mixture to produce an organic fertilizer having a moisture content of about 15% or less, a carbon to nitrogen ratio of about 25:1 or less, and a total nitrogen content of from about 3% to about 6% by weight, wherein from about 80% to about 95% the total nitrogen is organic nitrogen, and from about 5% to about 20% of the total nitrogen is plant-available nitrogen.

2. The method of claim 1, wherein the combining and the reducing the particle size of the base mixture occur simultaneously.

3. The method of claim 1, wherein the dehydrating and the subjecting the base mixture to a thermal stabilization process occur simultaneously.

4. The method of claim 1, further comprising:
   providing a composition of animal waste;
   drying the animal waste composition to a moisture content of about 15% by weight or less;
   subjecting the animal waste composition to a thermal stabilization process;
   mixing the dried and thermally stabilized animal waste composition with the thermally stabilized base mixture;
   wherein the organic fertilizer comprises:
      a phosphorous content of from about 1% to about 11% by weight, and
      a potassium content of from about 1% to about 11% by weight.

5. The method of claim 1, wherein the carbon to nitrogen ratio is about 10:1 or less.

6. The method of claim 1, further comprising:
   providing a composition of dormant nitrogen mineralizing microorganisms; and
   inoculating the organic fertilizer with the composition of dormant nitrogen mineralizing microorganisms.

* * * * *